United States Patent [19]

Trikilis

[11] 4,358,909

[45] Nov. 16, 1982

[54] TURNSTILE

[76] Inventor: Emmanuel M. Trikilis, 1545 W. 130th St., Brunswick, Ohio 44212

[21] Appl. No.: 172,087

[22] Filed: Jul. 24, 1980

[51] Int. Cl.³ .............................................. E06B 11/08
[52] U.S. Cl. .......................................... 49/42; 49/46; 403/378; 403/205; 403/218
[58] Field of Search ............... 49/42, 43, 46; 403/174, 403/175, 205, 218, 378

[56] References Cited

U.S. PATENT DOCUMENTS

| 1,658,264 | 2/1928 | Sutton et al. | 403/378 X |
| 3,839,825 | 10/1974 | Nica | 49/46 X |
| 3,978,613 | 9/1976 | Hayward et al. | 49/46 |

Primary Examiner—Kenneth Downey
Attorney, Agent, or Firm—Fay & Sharpe

[57] ABSTRACT

A new turnstile is provided which is constructed from a minimum number of different extruded components and includes an improved turnstile control mechanism. The turnstile is comprised of a plurality of upstanding, spaced mounting columns which define a frame-like structure. One mounting column includes a plurality of spaced apart barrier arms extending radially therefrom. Closure means extend between at least a pair of mounting columns which are spaced opposite the one column. A pivot column is rotatably journaled intermediate the one and the at least a pair of mounting columns and includes a plurality of longitudinal grooves. A plurality of pivot column arms associated with each pivot column groove extend radially therefrom at spaced apart intervals to permit free passage between the barrier arms when the pivot column is rotated. Concealed locking pins and extruded spacers are advantageously employed to retain the barrier and pivot column arms in spaced, mounted relationships with the associated one mounting column and the pivot column. A pivot control mechanism selectively controls rotation of the pivot column and includes means to accommodate a plurality of different operational modes. An alternative embodiment comprises two pivot columns spaced apart from the at least a pair of mounting columns.

42 Claims, 14 Drawing Figures

TURNSTILE

BACKGROUND OF THE INVENTION

This invention pertains to the art of personnel monitoring or control systems and more particularly, to rotary gate devices which facilitate controlled passage between two separated areas.

The invention is particularly applicable to a turnstile for use in controlling and/or monitoring passage of personnel between two distinct areas as in, for example, entrance and/or exit areas into, out of or within various facilities. However, it will be appreciated by those skilled in the art that the invention can be readily adapted to use in other environments and applications.

Conventionally known turnstiles have generally comprised cage-like structures having enclosure walls provided at one side area thereof. These enclosure walls have typically been defined by arcuately configured sheet members or an assembly of intersecting vertical and horizontal members disposed in an arcuately shaped pattern. Prior turnstiles have also included rotor constructions comprised of vertically disposed pivot columns having vertically aligned rows of arms extending radially outward therefrom at spaced intervals therearound. The spacing of adjacent rows of these arms are sufficient for a person to pass through the associated turnstile as the rotor is rotated. Further, conventionally known turnstiles have included a vertically aligned row of fixed barrier arms on the side thereof opposite the enclosure walls and arranged to allow free passage of the rotor arms therebetween during rotation of the rotor. Various forms, types and constructions for turnstiles of the foregoing general type have heretofore been suggested and employed with varying degrees of success. It has been found, however, that defects present in these constructions are such that they very often impair their economic and practical value.

For example, prior turnstiles have been variously constructed from heavy iron or steel components and thereafter factory welded or otherwise assembled as by fasteners and the like into a complete unit. Such constructions have, however, suffered from a number of inherent problems. One problem has been the number of separate or individual component part designs involved which, in turn, has caused inventory, manufacturing and assembly difficulties. Another problem with preassembled constructions resides in the fact that they are heavy, awkward and costly to ship and install and present an aesthetically objectionable, prison-like appearance. Further, prior constructions which included protuberant structures, e.g., nuts, bolts, rivets and the like disposed exteriorally of the turnstile component surfaces, provide ready access to persons desirous of tampering with or vandalizing the structures. Such protuberances also present a hazard to turnstile users who may be cut, nicked or entangled in them. Still further, these turnstile assemblies have included various dirt-catching recesses, openings or the like which allowed the accumulation of dirt and rust which could ultimately hamper turnstile operation.

Still another particular problem encountered with prior turnstile constructions has centered on the rotor control mechanisms. It is these mechanisms which facilitate rotary control of the rotor to accommodate particular operational characteristics. Prior control mechanisms have not been particularly reliable or provided the degree of flexibility in operation to accommodate various desired rotor operational modes.

The present invention contemplates a new and improved apparatus which overcomes all of the above referred to problems and others and provides a new turnstile construction which is simple in design, economical to manufacture, aesthetically pleasing, light weight and of considerable strength, easy to assemble and install on site, reliable for a range of operational modes and readily adapted to a variety of applications.

BRIEF SUMMARY OF THE INVENTION

In accordance with the present invention, there is provided a turnstile construction particularly suited to facilitate selective controlled passage through an opening separating two distinct areas. In conjunction with the new turnstile, a new rotor construction and rotor control mechanism are advantageously provided.

More particularly, the new turnstile is generally comprised of a plurality of upstanding mounting columns spaced apart from each other to define a frame-like structure. Closure means are provided for enclosing a portion of the turnstile and extend between at least a pair of the mounting columns. An upstanding pivot column is spaced apart from at least a pair of mounting columns. This pivot column is journaled for selective rotation about its longitudinal axis and includes a plurality of pivot column arms extending radially outward therefrom. The pivot column arms are arranged in a plurality of rows at spaced intervals around the pivot column with the arms in each row spaced from each other. A pivot control mechanism facilitates selective rotational control of the pivot column through a plurality of operational modes.

In accordance with another aspect of the invention, one of the other of the mounting columns is spaced from the closure means and the pivot column. This particular mounting column includes a plurality of barrier arms at spaced intervals therealong extending radially outward therefrom generally toward the closure means.

In accordance with another aspect of the present invention, the mounting columns, the barrier arms, the pivot column and the pivot column arms all comprise extruded members. In the preferred construction, the mounting columns all comprise identical extrusions with the barrier arms and pivot column arms similarly comprising identical extrusions. Extruded members are also advantageously provided to act as spacers and receiving means within various portions of the turnstile construction.

According to a further aspect of the invention, an overhead panel is provided for fixedly interconnecting the mounting columns at their uppermost terminal ends in the desired spaced relationship to each other. This panel also supports the pivot control mechanism and provides a journal area for the pivot column upper end. In the preferred arrangement, the overhead panel is defined by a plurality of extruded plates.

According to yet another aspect of the invention, concealed means are provided for locking the barrier arms to the one mounting column and the pivot column arms to the pivot column. In the preferred arrangement, this locking means comprises locking pins interposed between the arms and the associated of the mounting and pivot columns.

In accordance with another aspect of the invention, there is provided a turnstile rotor comprised of an enlongated extruded pivot column having integrally formed longitudinal grooves at equidistantly spaced intervals therearound. A plurality of extruded pivot column arms have one terminal end thereof mountingly received in each groove and arranged to extend generally radially outward therefrom at spaced intervals therealong. Locking means interposed between one side wall of each groove and the associated of the arms maintain the arms in a desired position. In the preferred construction, the locking means comprises roll pins which are concealed from view.

In accordance with another aspect of the invention, spacers are received in the pivot column grooves for positioning the associated of the pivot column arms in some predetermined spacial relationship therealong. These spacers advantageously comprise extruded members.

According to a still further aspect of the invention, the pivot control mechanism includes a rotatably mounted cam having a continuous peripheral cam surface with a plurality of equidistantly spaced detents therealong adapted to define a plurality of home positions for an associated turnstile rotor. Cam followers normally urged toward following engagement with the cam surface are provided for generally biasing an associated turnstile rotor to one of the home positions. Means are also provided for selectively determining the general direction of allowable pivot column rotation. In the preferred arrangement, this determining means is defined by a plurality of pawls strategically located for predetermined controlling engagement with the cam surface. Means for preventing rotation of the turnstile rotor and/or for detecting such rotation may further be desirably included.

One object of the present invention is the provision of a new turnstile constructed from a minimum number of different, light weight extruded components.

Another object of the present invention is the provision of a turnstile having concealed means for interconnecting the turnstile components.

A further object of the present invention is a new turnstile control mechanism for selective control of the turnstile rotor.

Other benefits and advantages of the subject new turnstile will become apparent to those skilled in the art upon a reading and understanding of this specification.

BRIEF DESCRIPTION OF THE DRAWINGS

The invention may take physical form in certain parts and arrangements of parts, the preferred embodiment of which will be described in detail in this specification and illustrated in the accompanying drawings which form a part hereof and wherein.

DETAILED DESCRIPTION OF THE INVENTION

Referring now to the drawings wherein the showings are for purposes of illustrating the preferred embodiment of the invention only and not for purposes of limiting same, the FIGURES show a turnstile construction comprised of a plurality of mounting columns A, a turnstile rotor B, an overhead support frame C, enclosing or cage panels D, and a plurality of barrier and rotor arms E.

Figure 1:
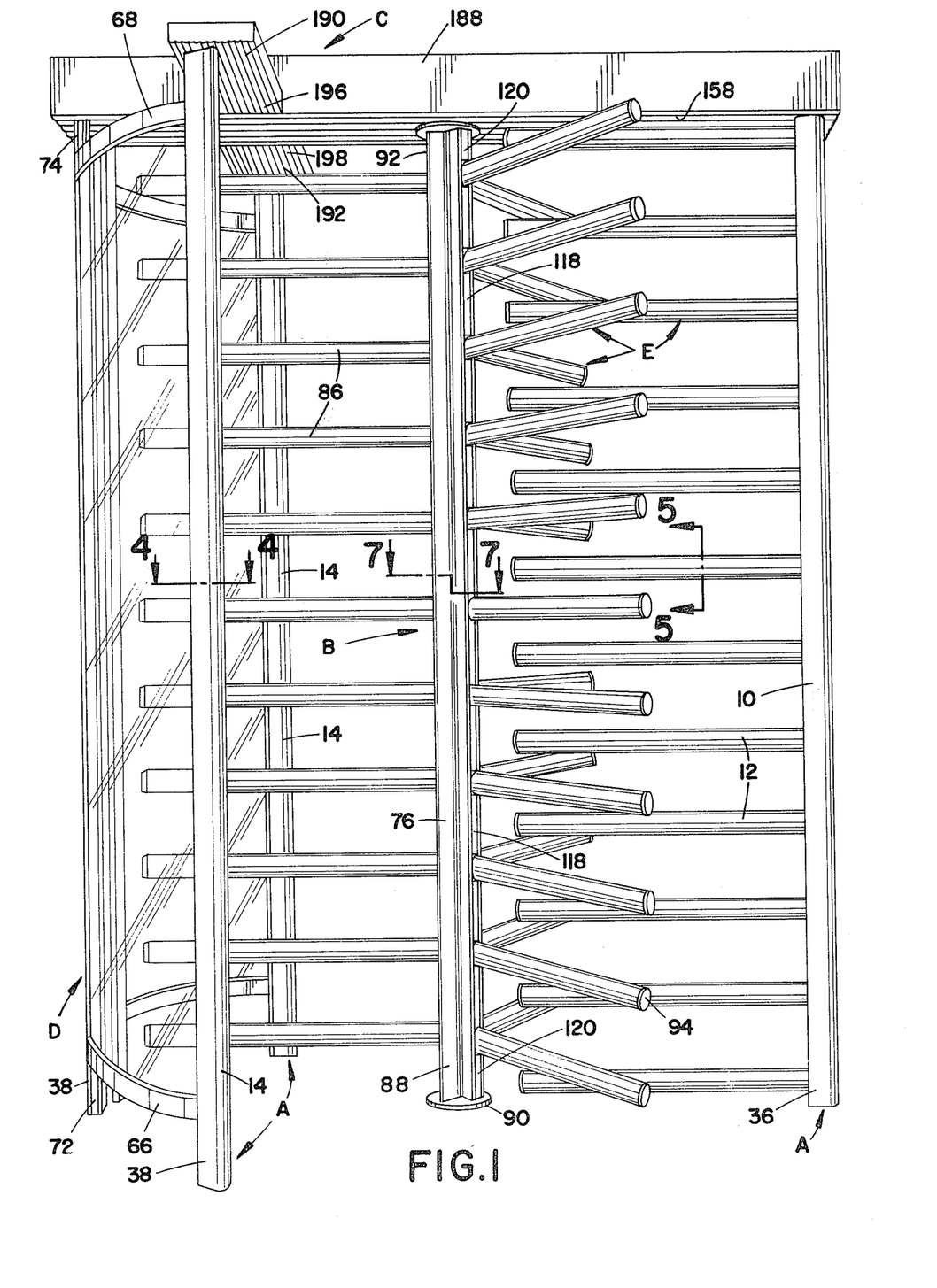
FIG. 1 is a perspective view of a turnstile formed in accordance with the present invention.
Figure 2:
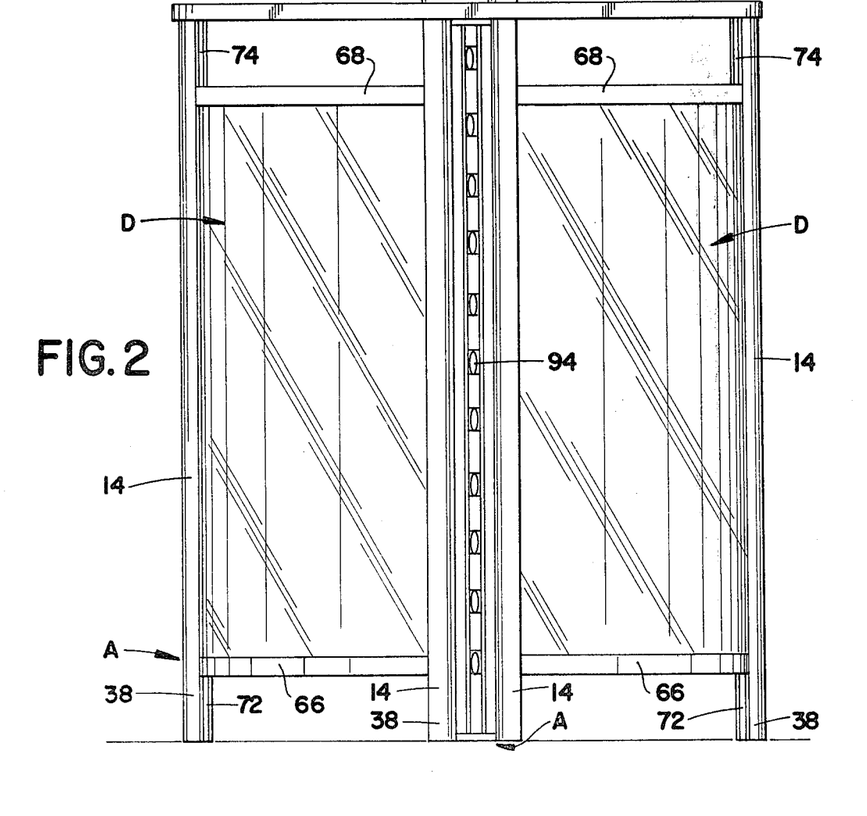
FIG. 2 is a side elevational view of the turnstile as viewed from the left hand side of FIG. 1.
Figure 3:
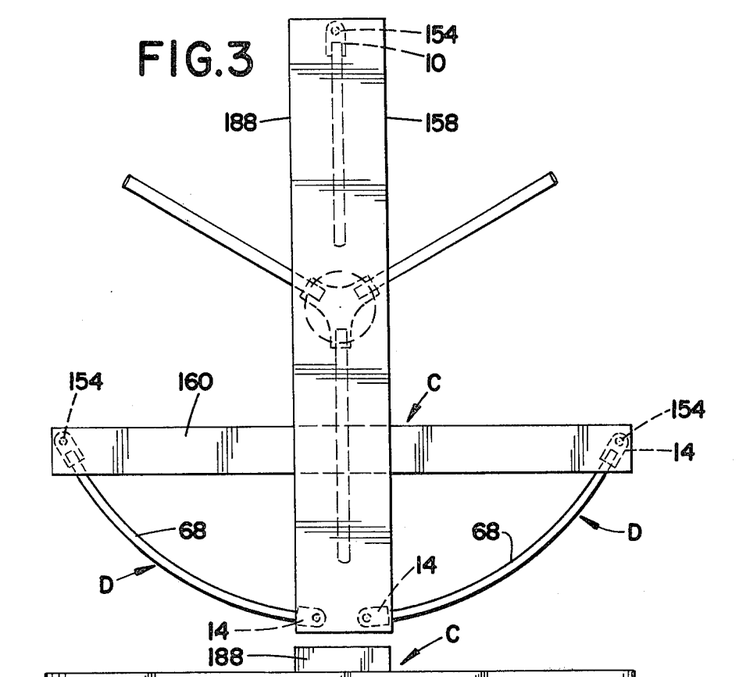
FIG. 3 is a plan view of the turnstile shown in FIGS. 1 and 2.

More specifically and with reference to FIGS. 1, 2 and 3, elongated, upstanding mounting columns A are spaced apart from each other to define a frame-like structure. As shown, one of these columns defines a barrier arm mounting column 10 having a plurality of barrier arms 12 extending radially outward therefrom at spaced intervals therealong. The other columns define panel mounting columns 14 which cooperate in pairs for receiving enclosing panels D.

Figure 4:
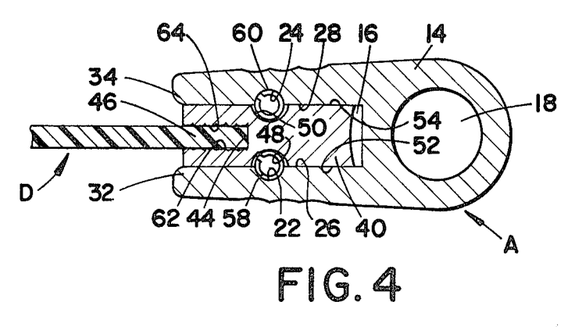
FIG. 4 is a cross-sectional view taken along lines 4—4 of FIG. 1.

With particular reference to FIG. 4, mounting columns 10,14 are identical in configuration and construction and include only rounded or radiused edges. Mounting columns 10,14 each have an outwardly opening channel 16 along one face thereof and an internal bore 18 which extends longitudinally over the entirety of the column lengths. Channel 16 has a generally rectangular transverse cross-section and includes opposed troughs 22,24 in side walls 26,28 thereof. Troughs 22,24 extend longitudinally of and continuous with the channel 16 for mounting barrier arms 12 as will be described hereinafter. Channel lips 32,34 are conveniently radiused to preclude cuts and nicks to turnstile patrons. In the preferred arrangement here under discussion, mounting columns A are defined by identical aluminum extrusions which include channels 16 and bores 18 integrally formed therewith. Of course, other configurations and materials may be satisfactorily employed without departing from the overall intent and scope of the invention.

With reference to FIGS. 1, 2, 3 and 4, panel mounting columns 14 are positioned generally opposite to barrier arm mounting column 12 with barrier arms 14 extending generally toward panels D. Mounting columns 10,14 are conveniently mounted at their lower ends or bases 36,38 by means of vertical studs (not shown) extending from within mounting column bores 18 into the surface or floor area upon which the turnstile rests for securely anchoring the turnstile in position. The surface or floor area involved may comprise a separate base-like area or may comprise the floor or support for the particular structure involved. Preferably, the studs extend through the entire length of the bores 18 to provide structural integrity to the turnstile frame structure. Of course, shorter studs, extending from within only a portion of the bores 18, could also be employed.

Panel mounting columns 14 are positioned so that channels 16 in the columns which comprise each pair are disposed in a generally facing relationship to each other. As shown in FIG. 4, each channel 16 is dimensioned to loosely receive one or more panel receiving members 40 therein. Panel receiving members 40 are preferably comprised of elongated aluminum extrusions with each receiving member including a channel 44 extending longitudinally thereof to receive the side edge portion 46 of an associated one of panels D. Receiving members 40 are configured so that they do not extend outwardly beyond channel lips 32,34 of the associated mounting column, therefore only rounded channel lips 32,34 are exposed to patrons of the turnstile. Longitudinal troughs 48,50 are included in the opposite side walls 52,54 respectively, of the receiving members in a manner so that they may be aligned with mounting column recessed troughs 22,24. With such alignment, concealed locking or retaining pins 58,60 may be lockingly interposed between channel side walls 26,28 and receiving member side walls 52,54. Preferably, locking or retaining pins 58,60 comprise compressible roll-spring pins urged into wedging interpositions. Pin 58 is lockingly interposed by driving the pin 58 into aligned troughs 22,48 with a driving force directed along the longitudinal troughs 22,48. Although opposed pins 58,60 are preferably illustrated for retaining receiving member 40, a single pin could also be employed.

Panels D function to enclose a portion of the turnstile and are preferably constructed from a translucent polycarbonate plastic. This plastic may be imparted with some desired color to enhance the overall aesthetics of the turnstile and, of course, alternative types of plastics as well as other materials may be used for the panels.

Panels D are mountingly framed in panel mounting columns 14. Side edge portions 46 of panels D (FIG. 4) are received in receiving members 40 and engaged by opposed retaining ridges 62,64 which extend longitudinally of the side walls of channels 44. The bottom and top edge portions of panels D are received by second receiving members comprising spaced part bottom receiving members 66 and top receiving members 68 (FIGS. 1 and 2) which extend generally laterally between the mounting columns 14 which define each pair of such columns. Receiving members 66,68 are, preferably, identical in construction to receiving members 40. Thus, the panel top and bottom edges are similarly received in channels 44 and engaged by retaining ridges 62,64 (FIG. 4) which extend longitudinally of members 66,68. Members 66,68 are shaped or bent to have an arcuate configuration (FIG. 3) in order to provide panels D with a shape which will accommodate clearance for the rotor as will be appreciated hereinafter.

Panel bottom spacers 72 (FIGS. 1 and 2) for spacing panels D from the turnstile support surface for supporting the lateral bottom receiving members 66 associated with the bottom edges of panels D are fixedly secured in mounting column channels 16 adjacent the bottom terminal ends thereof at the mounting column bases 38. Panel top spacers 74 for spacing panels D from the overhead support frame C are similarly fixedly sucured in mounting column channels 16 adjacent the top terminal ends thereof. Preferably, threaded fasteners (not shown) extending through panel spacers 72,74 into the associated panel mounting columns 14 are used to fixedly secure the spacers 72,74 in position. However, any comparable fastening device could also be employed. While only the panel spacers 72,74 associated with two of the mounting columns 14 are shown in FIGS. 1 and 3, it will be appreciated that all the mounting columns which support panels D have identical panel spacers unless otherwise specifically noted. Panel spacers 72,74 also preferably comprise extruded aluminum members and are similar in transverse cross-section to receiving members 40, except for the deletion of receiving member channels 44. The panel spacers 72,74 are, therefore, configured to substantially fill the associated of channels 16 to the panels D and eliminate any recessed areas which might otherwise catch dirt. Panel spacers 72,74 are configured so that they do not extend outwardly beyond channel lips 32,34 of the associated mounting column and only the rounded channel lips 32,34 exposed.

In the preferred embodiment of the invention, four panel mounting columns 14 are utilized in conjunction with two cage panels D for enclosing a portion of the turnstile. However, it will be appreciated by those skilled in the art that any other number of cage panels and panel mounting columns could be advantageously employed to enclose larger or smaller sections of the turnstile or to accommodate variations in design and/or aesthetics.

With particular reference to FIGS. 1, 7, 10, and 11, turnstile rotor B is shown positioned intermediate barrier arm mounting column 10 and panel mounting columns 14. The rotor B is generally comprised of an elongated upstanding pivot column 76 having a plurality of grooves 78,80,82 extending longitudinally therealong at equidistantly spaced intervals therearound with a plurality of identical pivot column arms 86 extending radially outward therefrom. The pivot column arms 86 are aligned in generally vertically disposed rows for defining a plurality of barrier planes. The angular spacing between grooves 78,80,82 and thus the spacing between adjacent rows of arms 86 is as deemed necessary and/or appropriate to suit a particular turnstile application. Preferably, however, three grooves 78,80,82 at 120° intervals are employed to satisfactorily accommodate persons who will be passing through the turnstile. Pivot column 76 is journaled for selective rotation about its longitudinal axis. To that end and in the preferred construction, pivot column base end portion 88 is mounted upon a polymeric cone bearing 90 and pivot column upper end portion 92 is supported in a suitable bearing mounted in overhead frame support C. Cone bearing 90 is of a two part, male and female, construction. The male part is fixedly secured to the surface or floor area upon which the turnstile rests. The female part journally receives the male part and the weight of the rotor B is primarily borne by the surface or floor area through the male part. Other mounting arrangements could also be satisfactorily employed within the spirit and scope of the invention.

As with the other components in the preferred construction here under discussion, pivot column 76 is comprised of an elongated member extruded from aluminum. Grooves 78,80,82 may be integrally formed with the pivot column at the time of extrusion to eliminate subsequent machining steps. As shown, column 76 has a somewhat triangular transverse cross-section with grooves 78,80,82 being equidistantly spaced apart at the vertices of the triangle. The configuration shown is aesthetically pleasing for the overall turnstile construction while minimizing the amount of material involved in providing a strong supporting element.

Grooves 78,80,82 are of a substantially similar configuration and have substantially the same transverse cross-sectional conformation as the mounting column channels 16 (FIG. 4). Likewise, barrier arms 12 and pivot column arms 86 are of identical construction and conformation. The foregoing relationships facilitate identical mounting of barrier arms 12 to the mounting column 10 and pivot column arms 86 in pivot column grooves 78,80,82. While description will hereinafter primarily be made to pivot column arms 86 in rotor 76, it should be appreciated that barrier arms 12 are mounted in like fashion unless otherwise specifically noted.

Figure 5:
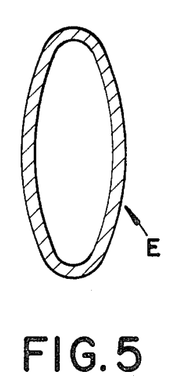
FIG. 5 is a cross-sectional view taken along lines 5—5 of FIG. 1.

With particular reference to FIG. 5, it will be seen that arms E which comprise the barrier and pivot column arms are hollow and have a generally elliptical or oval transverse cross-section. The outer terminal ends of arms E, i.e., those ends which are not received or mounted in grooves 78,80,82 or channel 16, are conveniently sealed with a plastic cap 94 (FIGS. 1 and 2).

Figure 6:
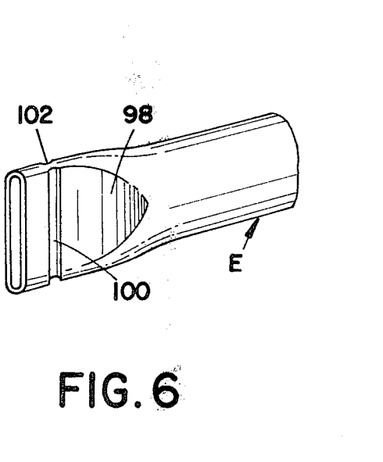
FIG. 6 is a perspective view of the terminal end portion of a turnstile arm.
Figure 7:
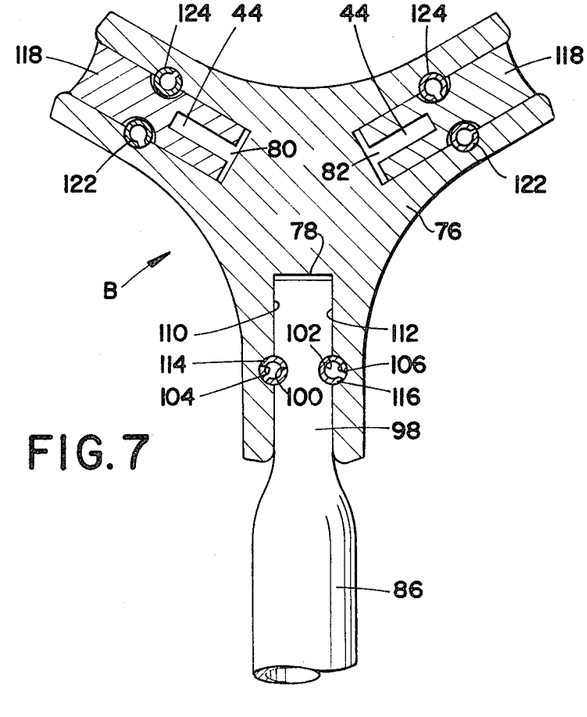
FIG. 7 is a cross-sectional view taken along lines 7—7 of FIG. 1.

As shown in FIGS. 6 and 7, the inner terminal end portion 98 of arm 86 which is to be received in pivot column groove 78 is pressed or otherwise formed to loosely fit in groove 78. Opposed arm recesses or troughs 100,102 are included at the arm inner terminal end portion 98 and are located to substantially align with opposed groove troughs 104,106 extending longitudinally along the side walls of groove 78. Arm troughs 100,102 have substantially the same conformation as receiving member troughs 48,50 (FIG. 4). Concealed locking or retaining means are conveniently interposed between the side walls 110,112 of the pivot column groove 78 and the arm terminal end portion 98. Preferably, and as shown in FIG. 7, the locking or retaining means comprises locking pins such as compressible roll-spring pins 114,116 or the like received in each set of aligned arm troughs 100,102 and groove troughs 104,106. Again, the mounting of barrier arms 12 to mounting column 10 is effected in a substantially like manner.

With particular reference to FIGS. 1 and 7, arms 12,86 are spaced apart from each other by means of a plurality of identical arm spacers 118 received in pivot column grooves 78,80,82 and channel 16 of mounting column 10. In the preferred arrangement, arm spacers 118 are identical in transverse cross-section to panel receiving members 40 but are located in grooves 78,80,82 and channel 16 so that the receiving member channels 44 face or open radially inward (FIG. 7). Spacers 118 are similarly secured in grooves 80,82 with concealed locking pins 122,124.

Column terminal end spacers 120 (FIGS. 1 and 10) are disposed adjacent the opposed terminal ends of grooves 78,80,82 at pivot column base end portions 88 and upper end portions 92 and are similarly disposed in channel 16 at mounting column base end portion 126 and top end portion 128 of mounting column 10. End spacers 120 are identical in conformation to panel spacers 72,74 and operate to seal grooves 78,80,82 and channel 16. Also, these end spacers ae similarly and preferably secured by mechanical fastening means therethrough (not shown) and into the associated of pivot column 76 or mounting column 10. Arm and end spacers 118,120 have length dimensions calculated so that pivot column and barrier arms 86,12 will be laterally spaced apart relative to each other for permitting free passage of the pivot column arms 86 between the barrier arms 12 when the pivot column 76 itself is rotated about its longitudinal axis during turnstile operation.

Figure 10:
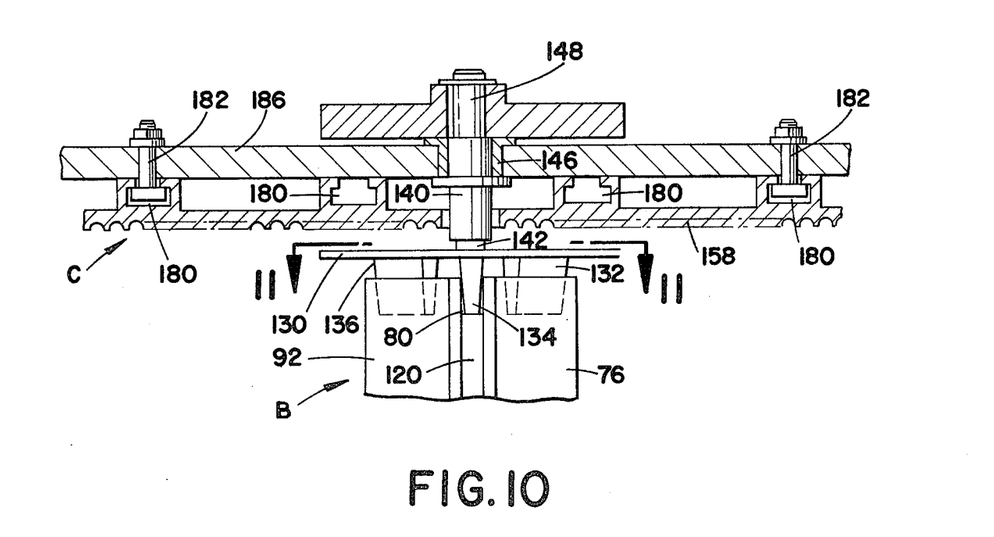
FIG. 10 is a plan view in partial cross-section of the turnstile rotor control mechanism.
Figure 11:
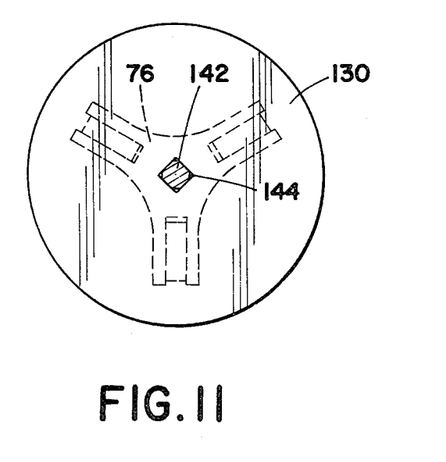
FIG. 11 is a cross-sectional view taken along lines 11—11 of FIG. 10.

With particular reference to FIGS. 1, 10 and 11, pivot column control plate 130 is mounted to pivot column 76 at pivot column upper end portion 92. Plate 130 is preferably constructed of stamped steel and has a generally cylindrical transverse cross section. Plate bosses 132,134,136 extend longitudinally outwardly from plate 130 and have truncated wedge-shaped transverse cross-sectional configurations. Bosses 132,134,136 are disposed to be wedgingly received in pivot column grooves 78,80,82 at pivot column upper terminal end portion 92 adjacent column terminal end spacers 120. Plate 130 is thus secured to pivot column 76.

Figure 8:
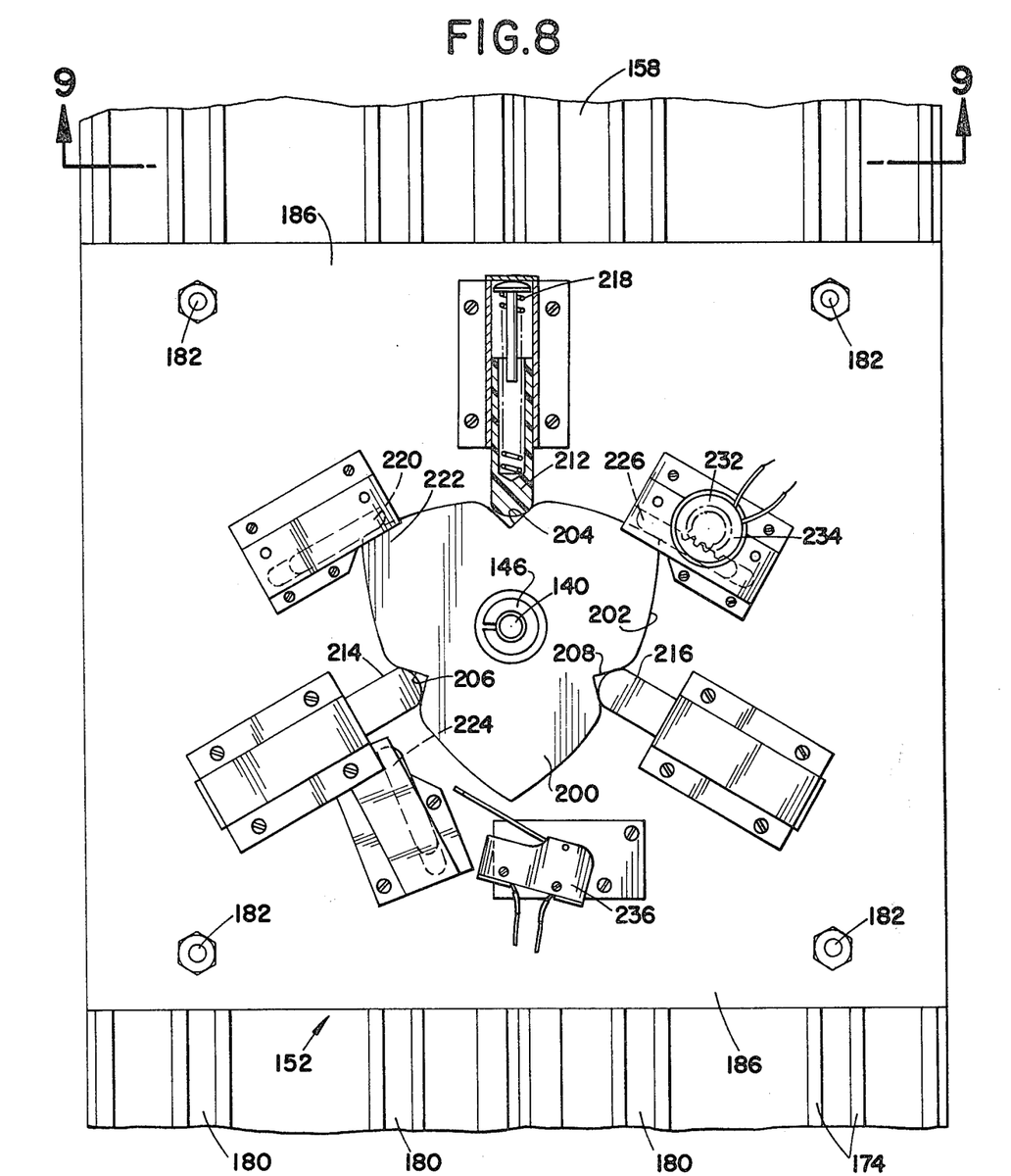
FIG. 8 is a plan view in partial cross-section of the turnstile rotor control mechanism.
Figure 9:
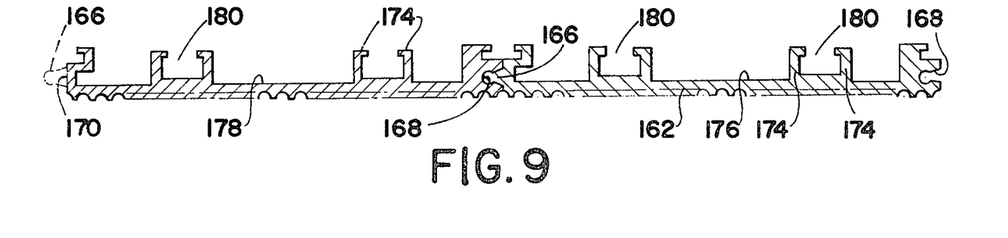
FIG. 9 is a cross-sectional view taken along lines 9—9 of FIG. 8.

Pivot column control shaft 140 is fixedly secured to plate 130. Shaft lower terminal end 142 is closely received in plate aperture 144 for maintaining corresponding rotational movement of shaft 140 as the pivot column 76 itself is rotated during turnstile operation. Shaft 140 further extends into overhead support frame C where it is journally supported by bearing member 146. Shaft upper terminal end 148 is secured to the rotor control mechanism 152 (FIG. 8).

Referring to FIGS. 2, 3, 8, 9 and 10, overhead support frame C interconnects mounting columns 10,14 at the uppermost terminal ends thereof and supports a rotor control mechanism 152 as well as a support bearing member 146 (FIG. 10). The overhead support frame is fixedly secured to each of mounting columns 10,14 by means of a plurality of identical vertical studs 154 (FIG. 3) extending upwardly from within bores 18 of each mounting column. Although any comparable fastening means may be employed, a nut (not shown) is preferably threadedly received on the stud to fixedly retain the overhead support frame C to the mounting columns.

As shown in FIG. 3, support frame C is itself generally comprised of first and second extruded panels 156,160 disposed in a transverse relationship with each other. First extruded panel 156 interconnects barrier arm mounting column 10 with two of the panel mounting columns 14 positioned opposite from the barrier mounting column 10. Second extruded panel 160 is affixed to the first extruded panel 158 intermediate the opposite ends thereof and interconnects the remaining two panel mounting columns.

More particularly, first extruded panel 158 is preferably comprised of a pair of identical plates 162,164 (FIG. 9) secured together along cooperating longitudinal side edges in a tongue 106 and groove 108 arrangement. The tongue originally provided with plate 164 is machined off to provide a smooth side edge 170. A plurality of identical opposed flanged extensions 174 are disposed in a direction generally normal to plate surfaces 176,178 and extend upwardly when the plate is positioned on the turnstile to provide longitudinal retaining slots 180 for receiving the heads of squarehead bolts 182 (FIG. 8). Bolts 182 are used to fasten a base 186 for rotor control mechanism 152 to first extruded panel 158. Additional bolts retained in slots 180 are conveniently used to secure first extruded panel 158 to second extruded panel 160. A frame cover 188 (FIGS. 1, 2 and 3) is provided to completely enclose or cover first extruded panel 158. Such cover may be easily fabricated from sheet metal or the like and protects the control mechanism 152.

Second extruded panel 160 is comprised of three plates having identical configuration to plates 162,164.

One upper plate (not shown) extends the length of second extruded panel 160. This plate rests upon and is fastened to first extruded panel 158 with the retaining slots 180 facing downwardly toward the mounting columns 10,14. Two lower plates 190,192 (FIG. 1) are fastened to the one upper plate with conventional threaded fasteners in a manner such that the fastener heads are retained in the retaining slots 180 of the two lower plates 190,192 with the shanks extending through the one upper plate to threadedly receive a nut. The inner terminal edge portions 196,198 of lower plates 190,192 abut the opposed side edges of first extruded panel 158. This arrangement thereby provides a generally smooth bottom surface for overhead support frame C.

Figure 12:
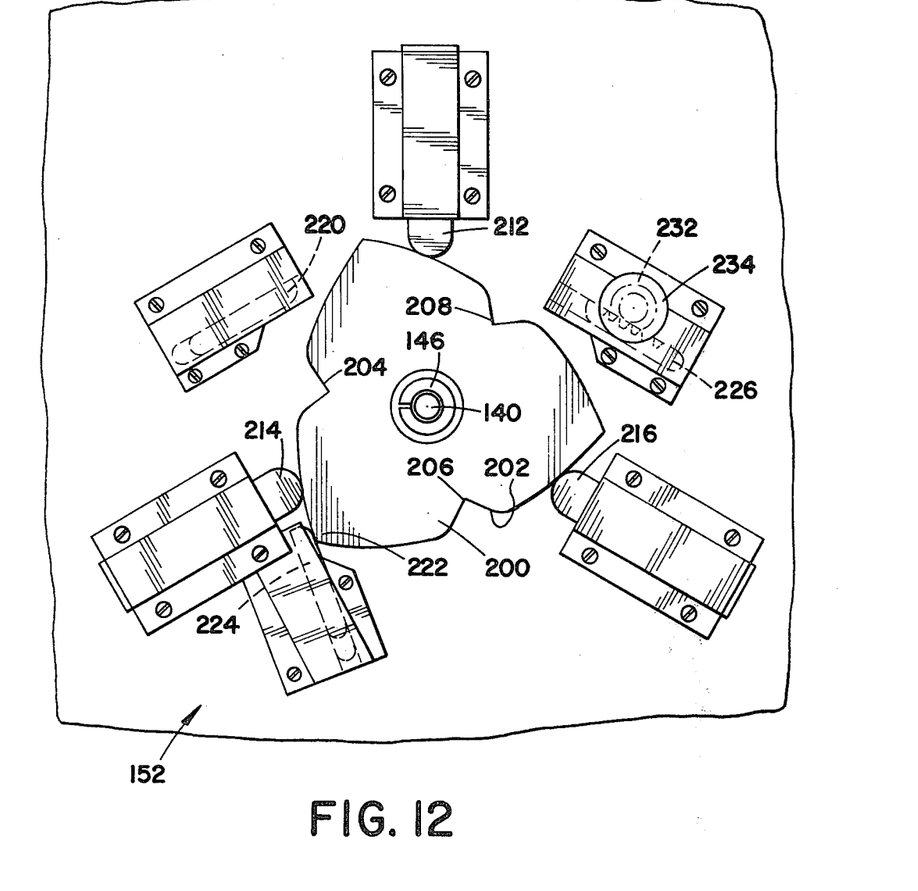
FIG. 12 is a plan view in partial cross-section of the turnstile rotor control mechanism showing the control mechanism cam in an alternate position from FIG. 8.

With particular reference to FIGS. 8 and 12, control mechanism 152 is provided for controlling the rotation of turnstile rotor B and, as previously noted, is supported in overhead support frame C. Control mechanism 152 is generally comprised of a cam 200 fixedly secured to shaft 140 which is rotatably mounted in support bearing member 146 which, in turn, provides a journal for upper end 92 of pivot column 76 (FIG. 1). Cam 200 includes a continuous peripheral cam surface 202 having a plurality of equidistantly spaced apart detents 204,206,208 spaced therearound. These detents 204,206,208 define a plurality of home positions for the turnstile rotor B and are positioned to be generally aligned with the barrier planes defined by pivot arm grooves 70,80,82. Of course, the number of detents in the cam surface would have to be modified commensurate with any deviation from the preferred three barrier planes shown and described above. A plurality of cam followers 212,214,216 mounted to rotor control mechanism base 186 are normally urged toward following engagement with the cam surface 202. Cam followers 212,214,216 may be biased in any conventional manner, however, preferably a compressible spring 218 (FIG. 8) is employed. One cam follower is preferably included for each detent and the followers are positioned to symmetrically engage the cam surface.

A first pawl 220 is cooperatively positioned relative to cam surface 202 for allowing rotational movement of the cam 200 in generally a single direction only for an angular extent greater than the angle defined between adjacent ones of detents 204,206,208. First pawl 220 is preferably spring biased and, in the view of FIG. 8, will obstruct rotation of cam 200 in a clockwise motion through engagement of prominent lobe 222 of cam surface 202.

A second pawl 224 is cooperatively positioned relative to cam surface 202 to similarly obstruct clockwise motion of cam 88. However, second pawl 224 is positioned relative to first pawl 220 by an angular extent less than the angle defined by adjacent ones of detents 204,206,208. Such cooperative positioning operates to limit bidirectional rotation of cam 200 to an angular extent defined by the included angle between first and second pawls 220,224. Preferably, the angular spacing between these pawls is approximtely one half of the angular extent between adjacent detents 204,206,208.

With particular reference to FIG. 12, as cam 200 is rotated counterclockwise, cam followers 212,214,216 are urged away from shaft 140 by the prominent lobes of cam 200 thereby compressing the biasing spring 218 in each follower.

Cam followers 212,214,216 tend to urge cam 200 to a selected position where the biasing spring 218 in each follower will be at its point of least compression. Such selected position is a home position of the cam 200 and the turnstile rotor B.

As cam 200 is further rotated, cam prominent lobe 222 similarly acts to urge second pawl 224 away from shaft 140 and compress the biasing spring of second pawl 224. After prominent lobe 222 has rotated beyond engagement with second pawl 224, second pawl 224 reverts to its position of greatest extension and operates to prevent clockwise rotation of cam 200. Second pawl 224 cannot be urged away from shaft 140 by clockwise movement of cam 200. Although only counterclockwise rotation has been discussed, pawls 220,224 can be selectively positioned to prevent rotation in either a clockwise or a counterclockwise direction.

Control mechanism 152 further includes a third pawl 226 selectively cooperable with cam surface 202 in conjunction with first pawl 220 to effectively prevent any rotational movement of cam 200. Preferably, a rotary solenoid 232 with spur gear attachment 234 is employed to selectively drive third pawl 226 into and out of a rotation preventing relationship with cam surface 202. When third pawl 226 is positioned to engage cam surface 202, it obstructs counterclockwise motion of cam 200 while first pawl 220 obstructs clockwise motion, thereby locking turnstile rotor B in a stationary position (FIG. 8). The rotary solenoid 232 may be conveniently actuated by remote means as could be deemed desirable for a particular turnstile application. Control mechanism 152 further includes a microswitch 236 for detecting rotational movement of cam 200. Microswitch 236 may be employed for various locking, signalling or counting purposes.

By way of example only, and for better appreciating the construction of the invention, a preferred embodiment has a height of 85 inches, a width of 65.5 inches and a depth of 55 inches. The overall weight is approximately 280 pounds.

Figure 13:
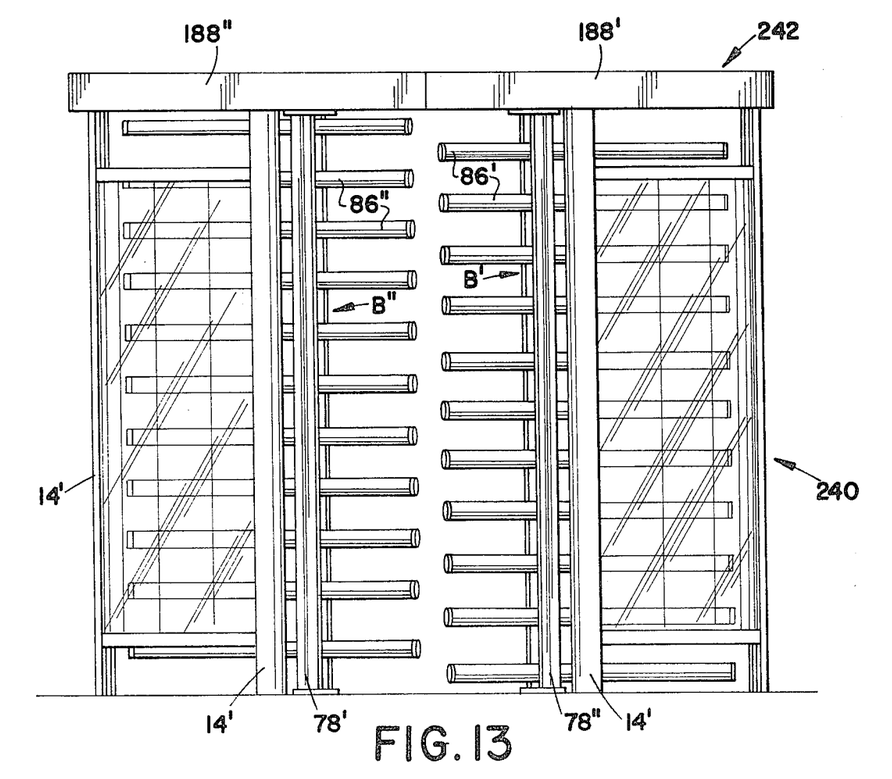
FIG. 13 is a side elevational view of an alternate embodiment of a turnstile formed in accordance with the present invention; and, FIG. 14 is a plan view of the turnstile shown in FIG. 13.
Figure 14:
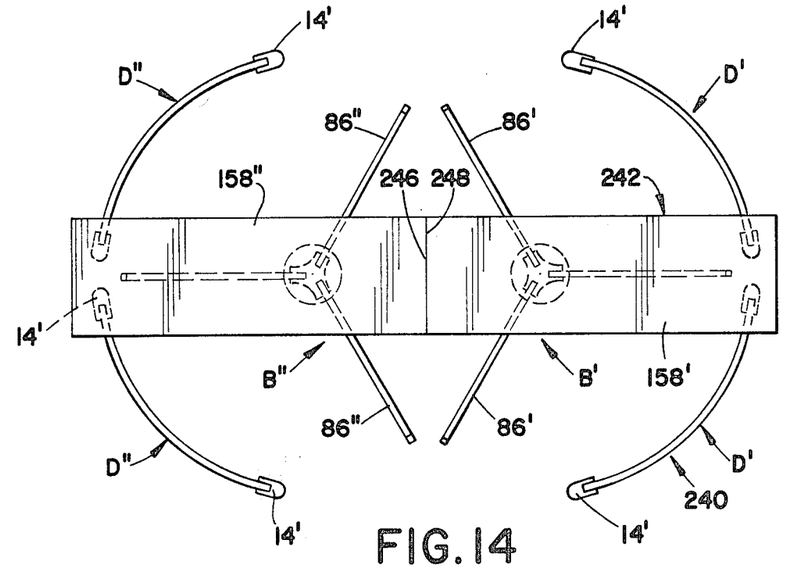

With particulr reference to FIGS. 13 and 14, an alternative embodiment of the invention is there shown. A twin turnstile 240, constructed from the components of the preferred embodiment, is shown having a plurality of panel mounting columns 14' positioned to define a frame-like structure for enclosing two identical turnstile rotors, B',B". Rotors B',B" have arms 86',86" spaced apart for permitting free passage of first column arms 86' between the second column arms 86" when the rotors B',B" are rotated during operation. Enclosing panels D',D" enclosing opposed ends of twin turnstile 240, are mounted in receiving members retained in the mounting column channels in the manner disclosed according to the preferred embodiment. Overhead support frame 242 interconnects the mounting columns 14' and supports a rotor control mechanism for each of the rotors B',B". Overhead support frame 242 is comprised of two first extruded panels 158',158" and two frame covers 188",188" securely fastened to each other at their opposed inner terminal end portions 246,248.

Twin turnstile 242 is preferably employed to allow the controlled passage of the maximum number of individuals possible through an opening too small for two embodiments of the invention having single rotors, placed back to back. Preferably, rotors B',B" are controlled by each rotor control mechanism to rotate in opposite directions thereby allowing controlled passage through turnstile 242 in a single direction through the two pathways adjacent the opposed enclosing panels D',D". Free passage of individuals in the same direction through the area intermediate the rotors B',B" is obstructed by the intersecting pivot column arms 86',86".

A turnstile formed in accordance with the present invention has a wide versatility in operation and uses. Through selective positioning of the rotor control mechanism, rotational movement of the rotor may be clockwise, counterclockwise, or bi-directional, while still precluding accidental jamming and entrapment of the turnstile patrons. Conventional remote control apparatus could be employed to lock, unlock, or control the directional rotation of the turnstile rotor through the use of remote actuated devices for selectively positioning pawls in operational relationships with the control mechanism cam surface for obtaining the desired rotational movement characteristics. Specifically, identification card or coin, token, or paper currency devices could be employed as remote control apparatus. A further particularly desirable optional remote control includes the use of a conventional shoplifting or pilferage detection system for any application in commerce, industry or institution, whereby the turnstile automatically locks upon detection of pilferage.

A turnstile construction is thus provided where all component mounting or fastening means are concealed; where all arms, mounting columns, overhead support frame and pivot columns expose only rounded surfaces to patrons of the turnstile; where dirt catching recesses are eliminated; and, where a simple and lightweight but sturdy construction provides easier and cheaper transportation and assembly.

The invention has been described with reference to the preferred embodiment. Obviously, modifications and alterations will occur to others upon a reading and understanding of the specification. It is intended to include all such modifications and alterations insofar as they come within the scope of the appended claims or the equivalents thereof.

Having thus described the invention, it is now claimed:

1. A turnstile construction adapted to facilitate selective passage between two separated areas, said turnstile comprising:
   a plurality of elongated upstanding mounting columns spaced apart from each other to define a frame-like structure at some predetermined location between said areas;
   closure means extending between at least a pair of said mounting columns;
   an elongated upstanding pivot column spaced from said pair of mounting columns and journaled for selective rotation about its longitudinal axis, said pivot column having a plurality of longitudinal grooves disposed at spaced intervals therearound;
   a plurality of pivot column arms associated with each pivot column groove arranged to extend radially outward of said pivot column, those column arms associated with each groove being spaced apart from each other in a generally aligned relationship with each other over at least a portion of the groove length;
   locking means received in each groove in a cooperative locking relationship with one end of the associated column arms; and,
   a pivot control mechanism operatively associated with said pivot column for selectively controlling rotation thereof, said mechanism including a cam having a continuous cam surface with a plurality of detents disposed at spaced intervals therealong for defining a plurality of pivot column home positions, a plurality of cam followers normally urged into engagement with said cam surface for generally biasing said pivot column to one of said home positions and means for determining the general direction of allowable pivot column rotation.

2. The turnstile as defined in claim 1 wherein one of the other of said mounting columns is spaced from said closure means and said pivot column and includes a plurality of barrier arms extending radially outward therefrom at spaced intervals along at least a portion thereof generally toward said closure means, said barrier arms being spaced apart from each other to permit free passage of said pivot column arms therebetween when said pivot column is selectively rotated about its longitudinal axis.

3. The turnstile as defined in claim 2 wherein said mounting columns comprise elongated extruded members, at least each of said pair of mounting columns including a channel extending longitudinally thereof with said channels being in a generally facing relationship with each other.

4. The turnstile as defined in claim 3 further including separate first receiving members disposed in said channel for retainingly receiving opposed side edges of said closure means, said closure means comprising at least one panel-like member.

5. The turnstile construction as defined in claim 4 further including retaining means interposed between a side wall of each channel and the associated of the receiving members, said retaining means being positioned by insertion thereof from a terminal end of the associated channel.

6. The turnstile as defined in claim 4 including second receiving members extending generally laterally between said pair of mounting columns for retainingly receiving opposed top and bottom edges of said panel-like member.

7. The turnstile as defined in claim 4 further including spacer members received in said channels intermediate said first receiving members and opposed channel terminal ends.

8. The turnstile as defined in claim 2 further including means for interconnecting said plurality of mounting columns in a desired spaced relationship at the uppermost terminal ends thereof, said interconnecting means supporting said pivot control mechanism and including a journal for the upper end of said pivot column.

9. The turnstile as defined in claim 8 wherein said interconnecting means comprises an overhead panel defined by at least one elongated extruded plate.

10. The turnstile as defined in claim 9 wherein said at least one elongated extruded plate comprises a pair of identical plates secured together along cooperating longitudinal side edges thereof.

11. The turnstile as defined in claim 2 wherein said barrier and said pivot column arms comprise extrusions.

12. The turnstile as defined in claim 11 wherein said extrusions have generally elliptical transverse cross-sections.

13. The turnstile as defined in claim 2 wherein said locking means comprises at least one locking pin interposed between a side wall of each mounting column groove and said one ends of the associated column arms received in said groove.

14. The turnstile as defined in claim 13 wherein said at least one locking pin comprises a plurality of locking pins with one pin being interposed between each column arm one end and said side wall of the associated mounting column groove.

15. The turnstile as defined in claim 2 wherein said one mounting column includes a barrier arm mounting channel extending longitudinally thereof for receiving one terminal end portion of said barrier arms.

16. The turnstile as defined in claim 15 further including barrier arm spacers received in said one mounting column channel for positioning said barrier arms in some predetermined spacial relationship therealong.

17. The turnstile as defined in claim 16 wherein said barrier arm spacers comprise extruded members.

18. The turnstile as defined in claim 16 further including barrier arm retaining means interposed between a side wall of said one mounting column channel and said barrier arm one terminal end portions.

19. The turnstile as defined in claim 2 further including pivot column arm spacers received in said plurality of grooves for positioning the associated of said column arms in the desired generally aligned relationship with each other.

20. The turnstile as defined in claim 19 wherein said column arm spacers comprise extruded members.

21. The turnstile as defined in claim 2 wherein said pivot column is comprised of an extrusion and includes said grooves formed integral therewith, said grooves being generally equidistantly spaced apart from each other around said pivot column.

22. The turnstile as defined in claim 21 wherein said plurality of mounting columns are defined by substantially identical extrusions and include a channel formed integral therewith extending longitudinally thereof.

23. The turnstile as defined in claim 22 wherein said plurality of mounting columns include a bore extending longitudinally therethrough.

24. The turnstile as defined in claim 22 wherein said pivot column grooves and mounting column channels have substantially the same transverse cross-sectional conformation.

25. The turnstile as defined in claim 24 wherein said barrier arms have one terminal end thereof received in the channel of said one mounting column, said turnstile further including spacers received in said pivot column grooves and said one mounting column channel for positioning the associated of the barrier arms and pivot column arms in a desired spacial relationship therealong.

26. The turnstile as defined in claim 25 wherein at least some of said spacers include closure means receiving grooves extending longitudinally thereof, said at least some spacers being received in the channels of said at least a pair of mounting columns with said closure means receiving grooves opening coextensive with said channels and receiving side edges of said closure means.

27. The turnstile as defined in claim 26 wherein said at least some spacers generally laterally between the channels of said at least a pair of mounting columns for supporting top and bottom edges of said closure means.

28. The turnstile as defined in claim 25 wherein said barrier and pivot column arms comprise extruded members having substantially the same transverse cross-sectional conformation, said locking means also being received in said one mounting column channel in a cooperative locking relationship with said barrier arm one terminal ends.

29. The turnstile as defined in claim 28 wherein said locking means comprises locking pins interposed between a side wall of each pivot column groove and said one end of the associated pivot column arms and between a side wall of said one mounting column and said barrier arm one terminal ends.

30. The turnstile as defined in claim 29 wherein said locking pins comprise roll pins.

31. The turnstile as defined in claim 2 wherein said determining means comprises first and second pawls operatively engaging said cam surface for allowing said pivot column to rotate in generally one direction while generally preventing rotation in the opposite direction.

32. The turnstile as defined in claim 31 wherein said pivot control mechanism further includes a third pawl mounted for selective cooperative association with said cam surface in conjunction with said first pawl for locking said pivot column in a substantially non-rotatable position and means for selectively moving said third pawl into and out of cooperative association with said cam surface.

33. The turnstile as defined in claim 32 wherein said moving means comprises remote actuated driving means for positioning said third pawl relative to said cam surface.

34. A turnstile rotor comprising:
an elongated extruded unitary pivot column including a plurality of integrally formed grooves extending longitudinally therealong at equidistantly spaced intervals therearound;
a plurality of extruded pivot column arms mountingly associated with each groove and arranged to extend radially outward of said groove, the pivot column arms associated with each groove being spaced apart from each other in a substantially aligned relationship for defining a barrier plane; and,
locking means concealably contained and interposed between a side wall of each groove and terminal end of the column arms mountingly associated therewith for retaining said column arms in said grooves.

35. The turnstile rotor as defined in claim 34 wherein said pivot column includes three grooves.

36. The turnstile rotor as defined in claim 34 further including spacers received in said pivot column grooves for positioning the associated of said pivot column arms in some predetermined spacial relationship therealong.

37. The turnstile rotor as defined in claim 36 wherein said spacers are defined by extruded members and at least those spacers located at the opposite terminal ends of each groove are fixedly secured to said pivot column.

38. The turnstile rotor as defined in claim 34 wherein said locking means comprises locking pins wedgingly interposed between said side wall of each groove and the terminal ends of the associated pivot column arms.

39. A control mechanism for a turnstile rotor comprising:
a cam rotatably mounted in a support bearing and having a continuous peripheral cam surface including a plurality of equidistantly spaced apart detents therealong adapted to define a plurality of home positions for an associated turnstile rotor;
a plurality of cam followers normally urged toward following engagement with said cam surface;
a first pawl cooperatively positioned relative to said cam surface in operative engagement with said cam surface for allowing rotational movement of said cam in generally a single direction for an angular extent greater than the angle defined between adjacent ones of said detents; and, a second pawl cooperatively positioned relative to said cam surface in operative engagement with said cam surface for allowing bi-directional rotation of said cam for an angular extent less than the angle defined between said first pawl and said second pawl.

40. The control mechanism as defined in claim 39 further including a third pawl selectively cooperable with said cam surface in conjunction with said first pawl for preventing rotational movement of said cam and means for selectively moving said third pawl into and out of a rotation preventing relationship with said cam surface.

41. The control mechanism as defined in claim 40 wherein said moving means comprises remote actuated driving means for positioning of said third pawl relative to said cam surface.

42. The control mechanism as defined in claim 39 further including a means for detecting rotational movement of said cam.

* * * * *